Figures 1, 2:
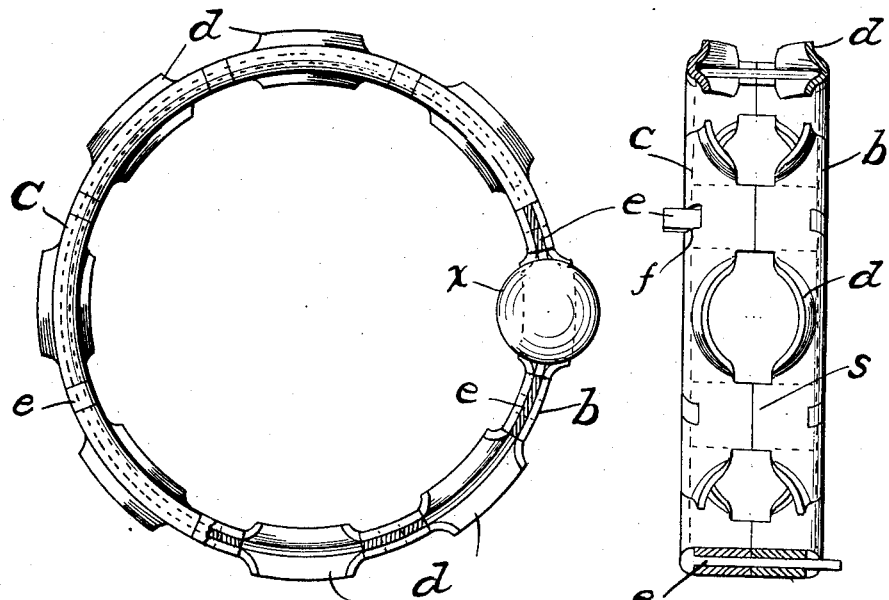

March 18, 1930.                A. H. LINDE                 1,750,641
                          CAGE FOR BALL BEARINGS
                            Filed Jan. 8, 1927            2 Sheets-Sheet 1

WITNESS:

INVENTOR
Andrew H. Linde
BY
Busser and Harding
ATTORNEYS.

March 18, 1930.  A. H. LINDE  1,750,641
CAGE FOR BALL BEARINGS
Filed Jan. 8, 1927   2 Sheets-Sheet 2

WITNESS:

INVENTOR
Andrew H. Linde
BY
ATTORNEYS.

Patented Mar. 18, 1930

1,750,641

UNITED STATES PATENT OFFICE

ANDREW H. LINDE, OF PHILADELPHIA, PENNSYLVANIA

CAGE FOR BALL BEARINGS

Application filed January 8, 1927. Serial No. 159,758.

This invention relates to ball-retaining separators or cages for use in ball bearings and has for its object to provide a strong, flexible and efficient sheet metal device of this character which will give long life in service under the most adverse conditions.

My invention is especially adapted to, and is of especial utility in connection with, the single row, high speed, radial type of ball bearing.

In the drawings, which show several of many possible specific embodiments of the invention—

Figures 3, 4:
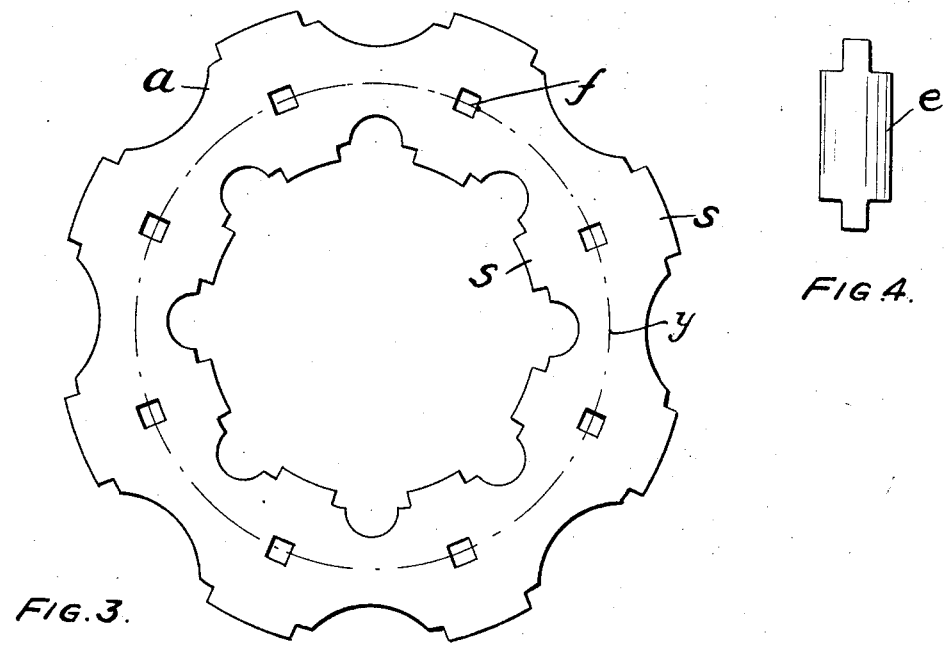

Fig. 1 is a face view, partly in section, of one embodiment of my invention. Fig. 2 is a side view of same, partly broken away. Fig. 3 is a developed view of the blank from which each of the cage members of Figs. 1 and 2 is formed. Fig. 4 is a detail view of the stud or rivet by means of which the members of the cage are connected.

Figure 5:
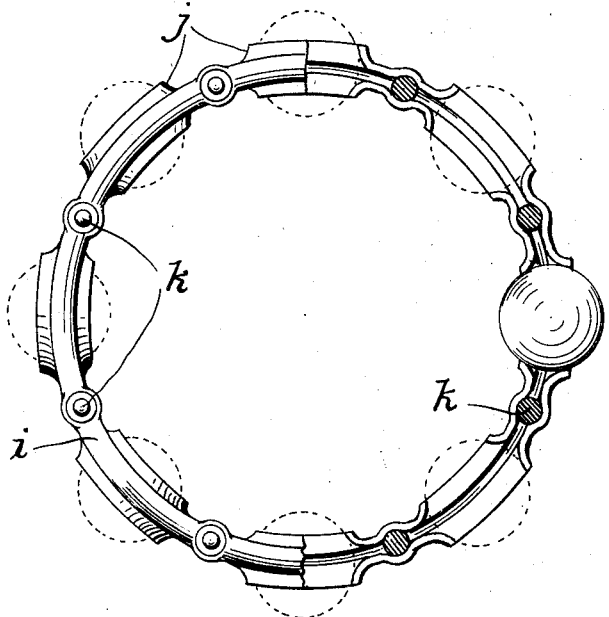
Figure 6:
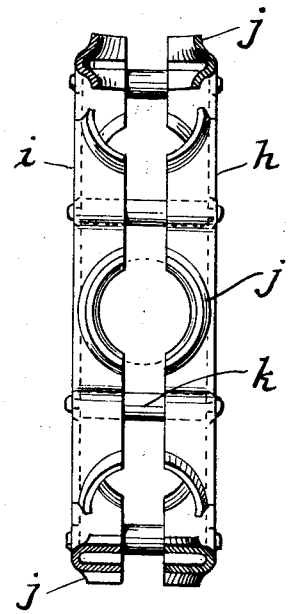
Figure 7:
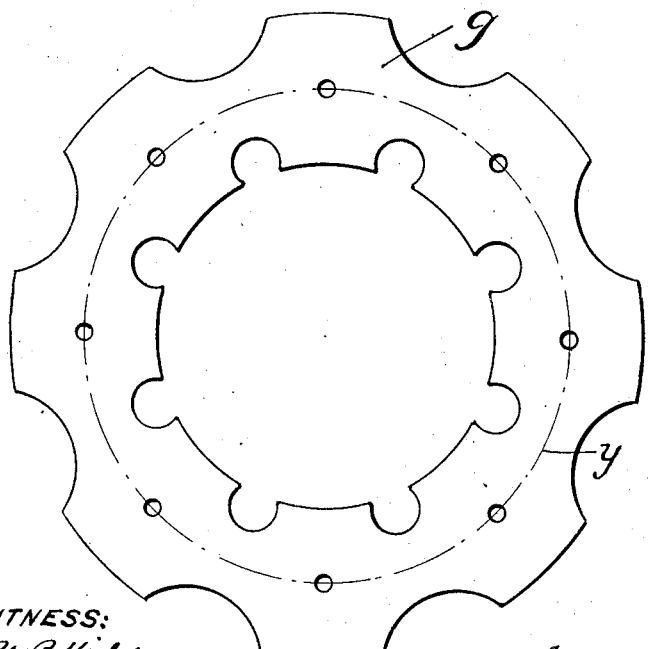

Fig. 5 is a face view of a part of a modified construction of cage. Fig. 6 is a side view of same, partly broken away. Fig. 7 is a view of the blank for either of the cage members of Figs. 5 and 6.

Figure 8:
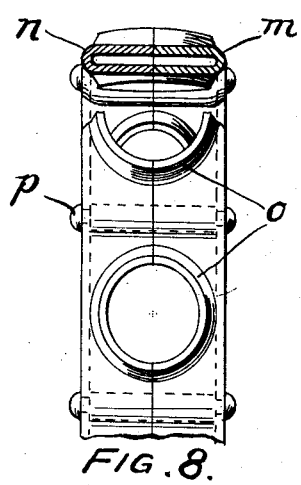

Fig. 8 is a view similar to Fig. 6 of another modification.

The cage comprises two ring members each preferably drawn or formed from a single flat blank, of which examples are shown in Figs. 3 and 7. Referring first to the construction shown in Figs. 1 to 4 inclusive:

From each blank $a$ is formed a unitary cage member $b$, or $c$, that is substantially U-shaped in cross-section, each member thus comprising two concentric cylindrical rings or plates with opposing faces spaced apart and connected along corresponding longitudinal edges. Along the other, or free, longitudinal edges of the two plates of the U member are formed a series of spaced-apart arcuate flanges $d$ appropriately shaped to form ball seats or pockets. The length of the arc subtended by each flange is preferably much less than 180°, and it is preferred that the free edges of the plates of the U member shall extend laterally beyond the ends of the arc, as shown in Fig. 2, although the ends of the arc may extend to the edges, as shown in Figs. 6 and 8.

During the operation of forming the members $b$ and $c$ from the blank $a$, the metal for the ball pockets is extruded, to form the flanges $d$, the metal of the outer plate of each member being projected outwardly and the metal of the inner plate of each member being projected inwardly.

The sections of the plates between the ball pockets of each cage member extend substantially parallel to the axis of the cage, and these sections of opposing plates present between them spaces or openings for spacer studs or shoulder rivets $e$, one of which is shown separately in Fig. 4. The contracted ends of the studs or rivets beyond their shoulders extend through holes $f$ (which are located on the circular line of bend of the blank) and are upset therein, and serve to align the ball pockets of opposing cage halves opposite one another and to connect the two cage halves securely together. Inasmuch as the body of each stud $e$ is confined between the parallel faces of the opposing plates of each cage member and is thereby substantially supported throughout its length, it cannot buckle or shift in any direction during the riveting operation. This feature is of decided importance in that it prevents misalignment of the two cage members when assembled together. The studs maintain the two halves of the cage properly spaced apart to permit free rotation of the balls $x$ in the pockets of the cage.

In the construction shown in Figs. 1 and 4, that part of the surfaces of the balls which has the highest speed of rotation does not contact with the flanges forming the ball pockets, thereby producing a minimum amount of friction and heat and also preventing the ball from creeping ahead between the cage members.

It will be noted that the pitch diameter (shown by the circle $y$ in Figs. 3 and 7) of each cage member is the same as that of the flat blank from which it is formed, this being a substantial improvement over prior structures which of necessity must be formed from a blank with a pitch diameter much greater than that of the finished cage. The forming operation that is practiced in the formation of my improved cage obviates excessive stretching or compression of the metal, which, as is well known, is injurious to the cage.

In the construction shown in Figs. 1 to 4 inclusive, the metal of the plates of each cage member between the ball sockets extends beyond the ends of the flanges toward the other cage member, the extensions s of each cage member abutting against the opposite extensions of the other cage member. A permissible modification would be to omit these extensions, so that the two cage members would be spaced apart, as shown in Fig. 6. In Figs. 5, 6 and 7, the construction specifically differs from that shown in Figs. 1–4 in the additional feature that the connecting studs or rivets are round in cross-section. In this modification, g is the original blank, h and i are the two cage members, j the flanges forming the ball pockets and k the rivets or studs connecting the two members h and i.

In Fig. 8 m and n are the two cage members, o the flanges forming the ball pockets and p the connecting rivets or studs. In this modification, the ends of the pairs of the flanges of opposing cage members abut against one another to form a pocket completely surrounding the ball. The flanges, however, should not extend throughout an arc of 180° but are preferably of shorter length so that only those surfaces of the balls adjacent their axes of rotation and having a relatively low superficial speed of rotation contact with the flanges. The ball pocket of Fig. 8 is therefore not circular but approximates an oval form. It is preferred, also, that the flanges forming the ball pockets of the other embodiments of my invention hereinbefore described shall be curved on an arc whose radius is somewhat greater than that of the ball so as to reduce to a safe minimum the areas of contact between balls and pockets and limit the areas of contact to those surfaces of the ball having a relatively low speed of rotation. In Fig. 8, the two cage members are arranged to abut one against another as in Figs. 1 and 2.

Having now fully described my invention, what I claim and desire to protect by Letters Patent is:

1. A ball bearing comprising a cage and balls therein; the cage comprising two circular members each of an approximate U-shape in cross-section and provided at intervals along their free edges with pairs of flanges arranged opposite to the pairs of flanges in the other cage member and forming therewith ball pockets, each of said flanges extending through an arc substantially shorter than 180°, the corresponding ends of the corresponding flanges of the two cage members being spaced apart a substantial distance to prevent contact with the pockets of the fastest moving surfaces of contained balls.

2. A ball bearing comprising a cage and balls therein; the cage comprising two circular members each of an approximate U-shape in cross-section and provided at intervals along their free edges with pairs of flanges arranged opposite to the pairs of flanges in the other cage member and forming therewith ball pockets, each of said flanges extending through an arc substantially shorter than 180°, each pair of flanges constituting one half of a ball pocket being spaced a substantial distance from the pair of flanges constituting the other half of a ball pocket, and studs positioned between ball pockets and each extending across both cage members between opposing faces of each cage member and with ends engaging the crotches of the cage members.

3. A ball bearing comprising a cage and balls therein; the cage comprising two circular members each of an approximate U-shape in cross-section and provided at intervals along their free edges with pairs of flanges arranged opposite to the pairs of flanges in the other cage member and forming therewith ball pockets, each of said flanges being curved on an arc whose radius is larger than the radius of the contained ball, only those surfaces of the ball having a relatively low superficial speed of rotation therefore contacting with its containing pocket, thereby reducing friction to a minimum.

4. A cage for ball bearings comprising two members each comprising a metal sheet bent along a circumferential line between its edges to form a member approximately U-shaped in cross-section, the free circumferential edges of each member being provided with pairs of arcuate flanges arranged opposite to the pairs of arcuate flanges in the other cage member and forming ball pockets, each member having holes along the line of bend of the sheet and intermediate the ball pockets, and connecting studs having flat sides supported by the metal of opposing walls of said bent sheets to substantially prevent the cage from shifting radially and reduced in width at the ends to form projections engaging said holes and shoulders bottoming in the channels of said bent sheets to prevent substantial shift in a circumferential direction.

5. A cage for ball bearings comprising two cage members, each of which consists of a metal sheet bent to form a pair of concentrically disposed rings integrally joined along corresponding edges, the free edges of the rings being recessed, said cage members being disposed in axial alignment with corresponding recesses oppositely disposed to form ball receiving pockets, and members rigidly clamped between the rings of each of the cage members adjacent their free edges to prevent their displacement out of proper relative position.

6. A cage for ball bearings comprising two cage members, each of which consists of a metal sheet bent to form a pair of concentrically disposed rings integrally joined along corresponding edges, the free edges of the rings being recessed, said cage members being disposed in axial alignment with corresponding recesses oppositely disposed to form ball receiving pockets, and members rigidly clamped between the rings of each of the cage members adjacent their free edges to prevent their displacement out of alignment and engaging the cage members to secure them together.

7. A cage for ball bearings comprising two cage members, each of which, being formed from a flat blank in the form of a ring having recesses in its edges adapted to form ball receiving pockets by forming apertures along the pitch line of the blank and subsequently bending the portions of the material on opposite sides of the pitch line, consists of a pair of concentrically disposed recessed rings integrally joined along corresponding edges, said cage members being disposed in axial alignment with corresponding recesses oppositely disposed to form ball receiving pockets, and members rigidly clamped between the rings of each of the cage members adjacent their free edges and engaging within the apertures to prevent their displacement out of proper relative position.

In testimony of which invention, I have hereunto set my hand at Philadelphia, Pennsylvania, on this 4th day of January, 1927.

ANDREW H. LINDE.